G. SARTOR.
DEVICE FOR CLEANING WINDOWS AND OTHER FINISHED SURFACES.
APPLICATION FILED SEPT. 1, 1917.
1,299,785.
Patented Apr. 8, 1919.
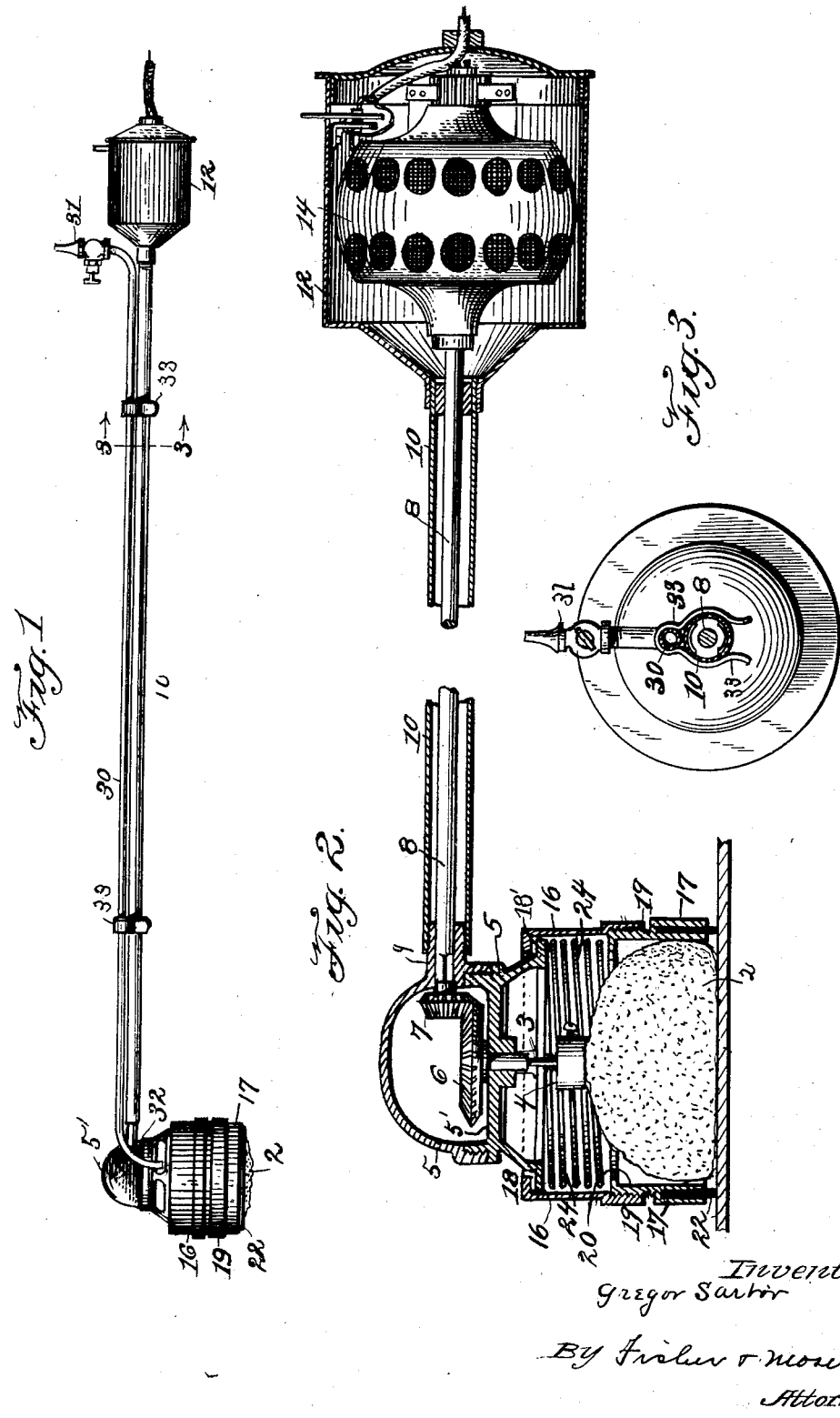

UNITED STATES PATENT OFFICE.

GREGORY SARTOR, OF PERKINS TOWNSHIP, ERIE COUNTY, OHIO.

DEVICE FOR CLEANING WINDOWS AND OTHER FINISHED SURFACES.

1,299,785. Specification of Letters Patent. Patented Apr. 8, 1919.

Application filed September 1, 1917. Serial No. 189,245.

*To all whom it may concern:*

Be it known that I, GREGORY SARTOR, citizen of the United States, residing at Perkins township, in the county of Erie and State of Ohio, have invented certain new and useful Improvements in Devices for Cleaning Windows and other Finished Surfaces, of which the following is a specification.

This invention relates to a device for cleaning windows and other finished surfaces, all substantially as shown and described and particularly pointed out in the claims.

In the accompanying drawings Figure 1 is a side elevation of the complete device. Fig. 2 is an enlarged longitudinal sectional elevation of the device, partially broken out in the handle portion, and Fig. 3 is a cross section on line 3, 3, Fig. 1, looking to the right.

As thus shown the device is especially adapted to cleansing windows but quite as well to the washing of automobiles and other objects having polished surfaces which should be cleaned without scratching or marring the same, and comprises, as a first element, a sponge 2, or its equivalent, affixed or attached in any preferred or practical way to a rotatable shaft 3 which has a sleeve 4 and means therewith by or through which the sponge is removably engaged with the shaft. The said shaft has its bearing centrally in a supporting member or body part 5' having a flat bottom provided with said bearing and a separate dome shaped top 5, and the two gears which operate said shaft are confined in this body and comprise a bevel gear 6 on the shaft 3 and a bevel pinion 7 on the power or driving shaft 8.

The plan of the device contemplates a fairly long handle so as to reach to the top of high windows and also to introduce the sponge into places otherwise difficult to reach, and the said handle, 10, is tubular and affixed at one end to the said body 5 over a short stud 9 engaged therein and an electric motor casing 12 is fixed on the other end of said handle. A motor 14 is supported in said casing and the outer end of the said power shaft is axially engaged therein so that, in effect, the shaft 8 is the motor or drive shaft for the device.

The body part 5' has an open work skirting 18 flaring outward and provided with a flange 18' about its bottom, and drum 16 has an inturned flange about its top seated on flange 18'. At its bottom said drum has an outwardly shouldered portion 19 and a depending drum 20 has an inwardly extending flange at its top serving as a rest for the coiled spring 24 and is threaded about its outer upper portion to screw into a thread on the inside of shouldered portion 19, and in respect to which said lower drum is more or less adjustable in said threaded connection to give more or less tension to said spring.

The lower drum 20 has an offset annular band-like portion 17 about its lower portion apart from the side thereof sufficiently to form an intervening space adapted to receive a band-shaped rubber ring 22, and which when inserted for use is deep enough to project beneath the enclose thereof relatively as shown and serving as a soft flexible protecting medium for delicate polished surfaces engaged thereby in the use of the device.

The spiral spring 24 rests between the parts 18 and 20 and comes just within the wall of drum 16 in its coils, and is adapted to yield more or less on pressure being exerted through the part 18.

Water is introduced for flushing the sponge by means of a tube or pipe 30 having a nipple 31 at its outer end to engage hose therewith and a curved discharge 52 at its outer end entering through said skirting and delivering the water to the sponge. Suitable spring clips 33 engage the tube or pipe 30 removably on the handle 10.

The term "sponge" as used herein includes any equivalent fibrous medium.

A sponge is shown herein but some other medium may be substituted such as a polishing disk or device other than a sponge, and used with or without water in cleansing or polishing a window or other surface.

What I claim is:

1. A device as described comprising a drum and a body with a flaring skirting about its bottom on which said drum is suspended, and a spring interposed between the interior of the drum at the edge of said skirting to normally depress the drum, in combination with a rotatable power driven surface cleansing medium mounted in said drum.

2. A device as described comprising a hollow body and a drum yieldingly supported thereon, in combination with a tubular handle fixed on said body, a shaft having its bearing centrally in said body and a drive shaft through the said handle and gears in said body operatively connecting said shafts.

3. A device as described comprising a sponge and a shaft on which the sponge is fixed, a drum inclosing the sponge and a support for said drum and said shaft, a tubular handle on said support, a power medium at the end of said handle and a shaft thereon extending through the handle into said support, and gears operatively connecting the ends of said shafts.

4. A device as described having a rotatable power driven sponge and a drum about the same and a support from which the drum is suspended about its edge, the said drum having an annular inwardly projecting flange on its inside and a spiral spring engaging said flange at one end and bearing against said support at its upper ends.

Signed at Cleveland, in the county of Cuyahoga and State of Ohio, this 22nd day of August, A. D. 1917.

GREGORY SARTOR.